US008086864B2

(12) United States Patent
Kim et al.

(10) Patent No.: US 8,086,864 B2
(45) Date of Patent: Dec. 27, 2011

(54) LOW POWER HMAC ENCRYPTION APPARATUS

(75) Inventors: Moo Seop Kim, Daejeon (KR); Young Sae Kim, Daejeon (KR); Young Soo Park, Daejeon (KR); Ji Man Park, Daejeon (KR); Sung Ik Jun, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 900 days.

(21) Appl. No.: 12/103,559

(22) Filed: Apr. 15, 2008

(65) Prior Publication Data
US 2010/0031052 A1 Feb. 4, 2010

(30) Foreign Application Priority Data
Jul. 9, 2007 (KR) ........................ 10-2007-0068874

(51) Int. Cl.
*H04L 9/32* (2006.01)
*H04K 1/00* (2006.01)
*H04L 9/00* (2006.01)
*H04L 9/28* (2006.01)
(52) U.S. Cl. ......................................... 713/181; 380/28
(58) Field of Classification Search .................... 380/28; 713/181
See application file for complete search history.

(56) References Cited

U.S. PATENT DOCUMENTS

| | | | |
|---|---|---|---|
| 6,829,355 B2* | 12/2004 | Lilly ................................. | 380/28 |
| 7,151,829 B2* | 12/2006 | Condorelli et al. ............. | 380/28 |
| 7,299,355 B2* | 11/2007 | Qi .................................. | 713/168 |
| 7,376,685 B2* | 5/2008 | Lee et al. ........................ | 708/200 |
| 7,489,779 B2* | 2/2009 | Scheuermann ................. | 380/28 |
| 7,962,753 B2* | 6/2011 | Satou ............................. | 713/180 |

(Continued)

FOREIGN PATENT DOCUMENTS
EP 1351432 A1 10/2003
(Continued)

OTHER PUBLICATIONS
FIPS 180-2 Secure Hash Standard. Aug. 1, 2002. p. 1-75.*
(Continued)

*Primary Examiner* — Christian LaForgia
(74) *Attorney, Agent, or Firm* — Nelson Mullins Riley & Scarborough LLP; EuiHoon Lee, Esq.

(57) ABSTRACT

There are provided a low power SHA-1 hash algorithm apparatus having a low power structure and optimized to a trusted platform module (TPM) applied to a mobile trusted computing environment and a low power keyed-hash message authentication code (HMAC) encryption apparatus using the low power SHA-1 hash algorithm apparatus, the HMAC encryption apparatus including: a key padder padding key data for HMAC algorithm; an XOR operator XOR operating the padded key data and a padding constant; a data connector connecting a text to be encrypted, to data obtained by the XOR operating; a data padder padding the connected data; an SHA-1 hash algorithm part performing an SHA-1 hash algorithm on the padded data; a data selector selecting and applying one of a result of the SHA-1 hash algorithm and the text to be encrypted, to the data connector; and a controller controlling operations of the key padder, data connector, and data padder, a sequence of performing a hash algorithm of the SHA-1 hash algorithm part, and storing an operation result to read data required for performing an encryption operation and store data with memory.

15 Claims, 6 Drawing Sheets

U.S. PATENT DOCUMENTS

| | | | |
|---|---|---|---|
| 2002/0032551 A1* | 3/2002 | Zakiya | 703/2 |
| 2002/0184498 A1* | 12/2002 | Qi | 713/168 |
| 2003/0135743 A1* | 7/2003 | Scheuermann | 713/189 |
| 2003/0198342 A1* | 10/2003 | Condorelli et al. | 380/37 |
| 2004/0260740 A1* | 12/2004 | Liu | 708/490 |
| 2005/0076216 A1* | 4/2005 | Nyberg | 713/171 |
| 2005/0089160 A1* | 4/2005 | Crispin et al. | 380/28 |
| 2005/0144204 A1* | 6/2005 | Lee et al. | 708/200 |
| 2008/0019524 A1* | 1/2008 | Kim et al. | 380/259 |
| 2008/0107259 A1* | 5/2008 | Satou | 380/28 |

FOREIGN PATENT DOCUMENTS

| | | |
|---|---|---|
| JP | 2002-287635 | 10/2002 |
| KR | 100581662 B1 | 5/2006 |
| KR | 100656375 B1 | 12/2006 |

OTHER PUBLICATIONS

Korean Office Action for Application No. 10-2007-0068874, dated Nov. 29, 2008.

* cited by examiner

LOW POWER HMAC ENCRYPTION APPARATUS

CROSS-REFERENCE TO RELATED APPLICATIONS

This application claims the priority of Korean Patent Application No. 10-2007-0068874 filed on Jul. 9, 2007, in the Korean Intellectual Property Office, the disclosure of which is incorporated herein by reference.

BACKGROUND OF THE INVENTION

1. Field of the Invention

The present invention relates to a hash algorithm apparatus and an encryption apparatus using the same, and more particularly, to a low power SHA-1 hash algorithm apparatus having an optimized low power structure of a keyed-hash message authentication code (HMAC) algorithm used to a platform related to an integrity verification on a platform and user authentication in a mobile device having a limited power resource such as a mobile trusted computing environment, such as a mobile phone and a personal digital assistant or an embedded system requiring low power consumption, and a low power HMAC encryption apparatus using the low power SHA-1 hash algorithm apparatus.

The present invention has been partly supported by the IT R&D program of MIC/IITA [2006-S-041-02, titled: Development of a Common Security Core Module for Supporting Secure and Trusted Service in the Next Generation Mobile Terminals].

2. Description of the Related Art

Recently, together with rapid development of wireless network technology, as it becomes a high degree of a digital information-oriented society and electronic commercial transactions are activated, encryption technology is considered as core technology for stability and reliability of social, economic activities and protecting privacy of a user based on high speed Internet networks. Particularly, a mobile platform such as a mobile phone may be an object of an attack from a hacker or other harmful programs if there is no suitable security management.

On the other hand, trusted computing group (TCG) is a group developing and promoting open specification on a security solution for various computing systems. Recently, TCG published several documents and standards defining the execution of various applications for stable processes related to booting a system, an administration of an environment of a platform, and a personal computing platform. An essential element of TCG standards is trusted platform module (TPM) monitoring a platform and reporting a state thereof.

The TPM may provide stable encryption key storage function together with public key encryption operation, signature, and the faculty of a hash function, as a separate trusted coprocessor. Also, internal state thereof is incapable of being arbitrarily operated by software of a host system. By using the security function of the TPM, a user may assure an initial environment of a platform or may seal or bind data to a certain environment of platform.

Particularly, mobile phone working group (MPWG) of the TCG extends security standards to be suitable for a mobile phone device. In the security standards, to estimate integrity of a platform and verify the integrity, a mobile trusted module (MTM) that is an essential security module for a mobile phone device designates that secure hash algorithm-1 (SHA-1) hash function using no key is used together with a keyed-hash message authentication code (HMAC) algorithm using a key.

The HMAC is an encryption method of generating a message authentication code (MAC) by using a hash function. Generally, a hash function is a function compressing a bit stream with a certain length into a hash code that is an output value with a fixed length. As a representative hash function, there is SHA-1 obtained by modifying/complementing SHA in 1995, the SHA was designed by national security agency (NSA) in 1993. The SHA-1 receives input data with a certain length, make input data 512 bit unit by using separating a message or using 0 padding, and performs round operation processes of 80 times, thereby obtaining an output of 160 bits and having resistibility against most of attacks.

However, there is a limitation on a memory and available power source and computing ability of most mobile devices or embedded systems, there are various technical difficulties to apply the security standards of the TCG to mobile phones. Particularly, in the case of mobile phones, since there is a limitation on a capacitance of a battery thereof, there is a great limitation on power consumption among such limitations. Accordingly, it is required to design a small low power SHA-1 circuit and an HMAC circuit.

SUMMARY OF THE INVENTION

An aspect of the present invention provides a low power SHA-1 hash algorithm apparatus having an optimized low power structure of a keyed-hash message authentication code (HMAC) algorithm used to a platform related to an integrity verification on a platform and user authentication in a mobile device having a limited power resource or an embedded system requiring low power consumption, and a low power HMAC encryption apparatus using the low power SHA-1 hash algorithm apparatus.

According to an aspect of the present invention, there is provided a low power SHA (secure hash algorithm)-1 hash algorithm apparatus, the apparatus including: a data input unit receiving and transferring data to be performed a hash algorithm; a data extension unit generating an intermediate value of each round for a hash algorithm by using the data to be performed the hash algorithm, by one 32-bit register; a message compression unit performing an SHA-1 hash algorithm on the generated intermediate value of the each round for the hash algorithm, by using one adder; a data output unit outputting a result value of the SHA-1 hash algorithm; and a hash algorithm control unit controlling operation sequences of the data extension unit and the message compression unit.

The data extension unit may include: a memory storing the data to be performed the hash algorithm and the intermediate value of the each round for the hash algorithm; one 32-bit register storing a result of an intermediate operation for obtaining the intermediate value of the each round for the hash algorithm; an XOR operator XOR operating the result of the intermediate operation, stored in the one 32-bit register, and the intermediate value of the each round of the hash algorithm, read from the memory; an input selector selecting and inputting one of a value obtained by the XOR operating, the data to be performed the hash algorithm, and the intermediate value of the each round for the hash algorithm, stored in the memory, to the one 32-bit register; a rotation operator rotating an output value of the one 32-bit register by one bit; and an output selector selecting and outputting one of a value obtained by the rotating by one bit and the data read from the memory, as the intermediate value of the each round for the hash algorithm, and may perform the data extension by low power consumption.

The message compression unit may include: a KH unit storing an initial value and a constant value for the hash algorithm; a first 32-bit register storing a result of adding one of a value obtained by shifting first data by 5 bits, values obtained by F-function operating second to fourth data stored in following second to fourth 32-bit registers, respectively, a round constant value, and the intermediate value of the each round for the hash algorithm and fifth data stored in a following fifth 32-bit register; a second 32-bit register storing the first data stored in the first 32-bit register; a third 32-bit register storing a value obtained by shifting the second data stored in the second 32-bit register by 30 bits; a fourth 32-bit register storing the third data stored in the third 32-bit register; a fifth 32-bit register storing the fourth data stored in the fourth 32-bit register; a rotation shifter shifting data outputs of the first and second 32-bit registers, respectively; an F-function operator F-function operating the second to fourth data of the second to fourth 32-bit registers; a plurality of input selector selecting a data path; and one adder calculating the first data by adding four times for each clock period.

The hash algorithm control unit may control the input selector in such a way that a value obtained by XOR operating four times is stored in the one 32-bit register.

According to another aspect of the present invention, there is provided a low power HMAC encryption apparatus using a low power SHA-1 hash algorithm, the apparatus including: a key padder padding key data for HMAC algorithm; an XOR operator XOR operating the padded key data and a padding constant; a data connector connecting a text to be encrypted, to data obtained by the XOR operating; a data padder padding the connected data; an SHA-1 hash algorithm part performing an SHA-1 hash algorithm on the padded data; a data selector selecting and applying one of a result of the SHA-1 hash algorithm and the text to be encrypted, to the data connector; and a controller controlling operations of the key padder, data connector, and data padder, a sequence of performing a hash algorithm of the SHA-1 hash algorithm part, and storing an operation result to read data required for performing an encryption operation and store data with memory.

The controller may determine one of the SHA-1 hash algorithm and the HMAC algorithm and may determine whether one of the SHA-1 hash algorithm and the HMAC algorithm is to be performed once or to be consecutively performed.

As described above, the low power SHA-1 hash algorithm apparatus and the low power HMAC encryption apparatus efficiently using the same may protect privacy of a user in wired or wireless data environment such as mobile trusted computing, radio frequency identification system, a wireless sensor network, and a home network.

Also, the present invention may be applied as essential encryption technology to provide stability such as integrity and authentication of data in network systems of wired or wireless environment and low power embedded systems where there are a lot of limitations on embodying an encryption circuit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
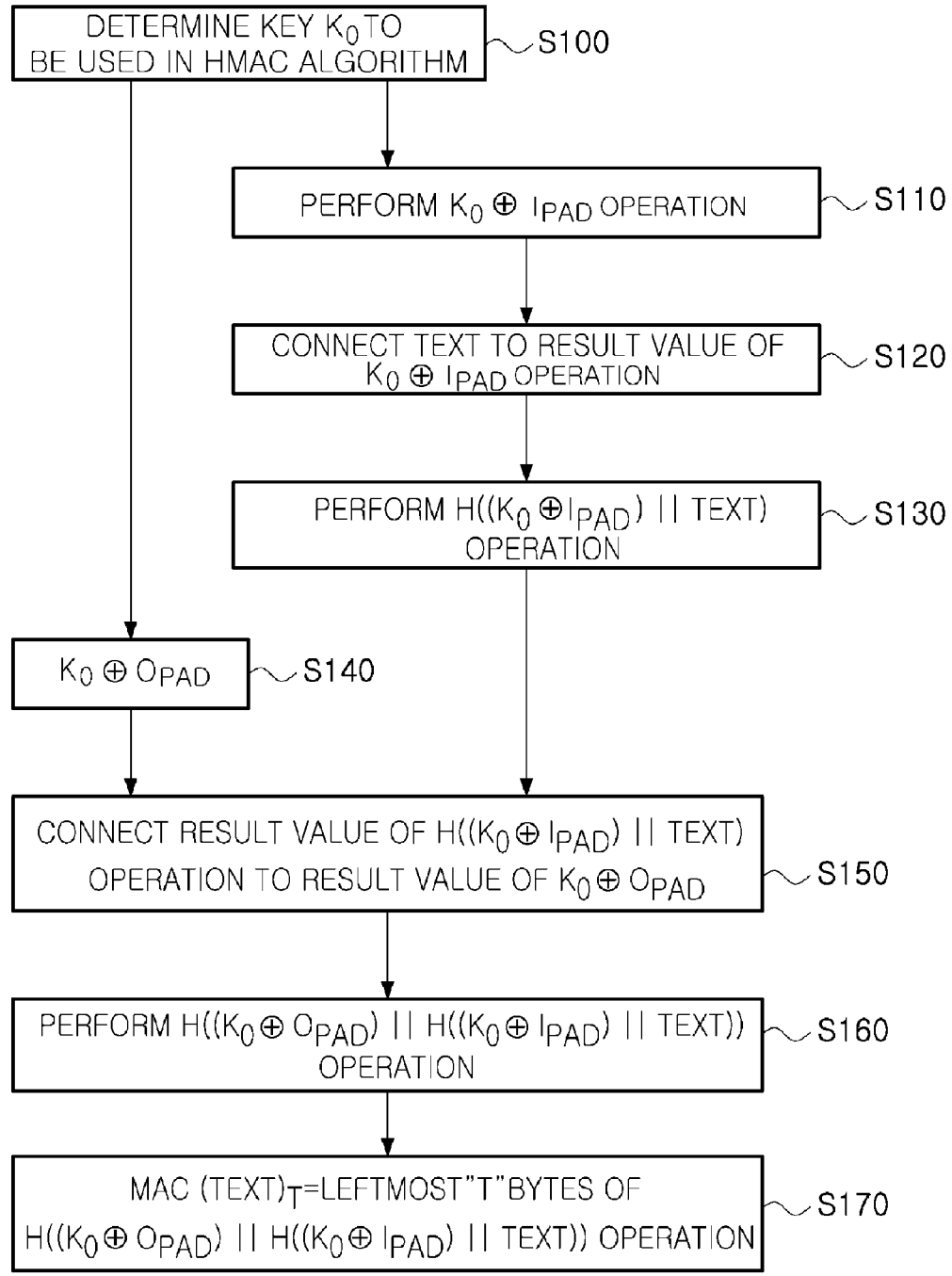
FIG. 1 is a flowchart illustrating a keyed-hash message authentication code (HMAC) algorithm shown in federal information processing standard (FIPS) publication (PUB)-198 that is a standard document of the HMAC.

Exemplary embodiments of the present invention will now be described in detail with reference to the accompanying drawings.

Only, in describing operations of the exemplary embodiments in detail, when it is considered that a detailed description on related well-known functions or constitutions unnecessarily may make essential points of the present invention be unclear, the detailed description will be omitted.

In the drawings, the same reference numerals are used throughout to designate the same or similar components.

Throughout the specification, when it is describe that a part is "connected to" another part, this includes not only a case of "being directly connected to" but also a case of "being electrically connected to", interposing another device therebetween.

Also, when it is described that an apparatus "includes" an element and there is no opposite description thereof, this is not designate that the apparatus excludes other elements but designates that the apparatus may further include other elements.

First, for understanding the present invention, before describing a configuration and operations, a general keyed-hash message authentication code (HMAC) algorithm will be described with reference to FIG. 1.

FIG. 1 is a flowchart illustrating an HMAC algorithm shown in federal information processing standard (FIPS) publication (PUB)-198 that is a standard document of the HMAC.

Referring to FIG. 1, a key K0 used for the HMAC algorithm in the HMAC is determined (S100).

In this case, a length of an inputted key K is identical to a block size B of secure hash algorithm (SHA)-1 used in a hash algorithm, for example, 512 bits, the inputted key K is determined to be the key K0. When the length of the key K is smaller than the block size B of the SHA-1 hash function used in the hash algorithm, the key K0 is determined by padding 0 after the inputted key K until the length of the key K is identical to the block size B. When the length of the inputted key K is greater than the block size B of an SHA-1 hash function, since there is no great effect on stability thereof, the length is left as it is. Related to this, in the FIPS PUB-198, a key size is reduced by one additional hash algorithm to be used. However, since the algorithm is capable of being performed in an upper program driving the HMAC, it is not considered in the present invention.

As described above, when the key K0 to be used in the HMAC algorithm is determined, the HMAC algorithm is performed using the determined key KO and a padding constant ipad (S110) and connects a text to be used in the HMAC algorithm to a result value of the HMAC algorithm (S120). With respect to data obtained by the connecting, an SHA-1 hash algorithm is performed (S130).

In this case, since a value of the key KO is the block value 512 bits of the SHA-1 hash, a value obtained by the connecting the text is greater than 512 bits that is the block value of the SHA-1 hash algorithm. Accordingly, to perform S130, two or more times of SHA-1 hash algorithms are required.

Also, the algorithm is performed on the key value KO by using a padding constant opad (S140), and a result value of S140 is connected to the result of the SHA-1 hash algorithm (S150). With respect to data obtained by the connecting of S150, the SHA-1 hash algorithm is performed again (S160).

As described above, since the key value KO is the block value 512 bits of the SHA-1 hash, a value obtained by the connecting the SHA-1 hash algorithm of S130 is greater than 512 bits that is the block size of the SHA-1 hash algorithm. Accordingly, in S160, two or more times of the SHA-1 hash algorithm are performed.

Among values of obtained by the hash algorithm in S160, leftmost "t" bytes is determined as a message authentication code (MAC) (S170).

According to the described above, the HMAC algorithm performs the SHA-1 hash algorithm of two stages.

That is, at a first stage, in S130, the SHA-1 hash algorithm is performed on a value obtained by connecting an XOR operation value $K_0 \oplus ipad$ to the text by the padding constant ipad by 512 bits. Since the value $K_0 \oplus ipad$ has a length greater than 512 bits, actually, two times of the SHA-1 hash algorithms are performed at the first stage.

At a second stage, in S160, the SHA-1 hash algorithm is performed on a value obtained by connecting the XOR operation value by the padding constant opad to an output of 160 bits that is the result of the hash algorithm in S130.

In this case, since data length of the XOR operation value $K_0 \oplus ipac$) is 512 bits and the result value of the S130 is connected thereto, a length thereof is greater than 512 bits. Accordingly, the SHA-1 hash algorithm is performed again.

Accordingly, when the SHA-1 algorithm apparatus is optimized, it is possible to embody a low power HMAC encryption apparatus.

Figure 2:
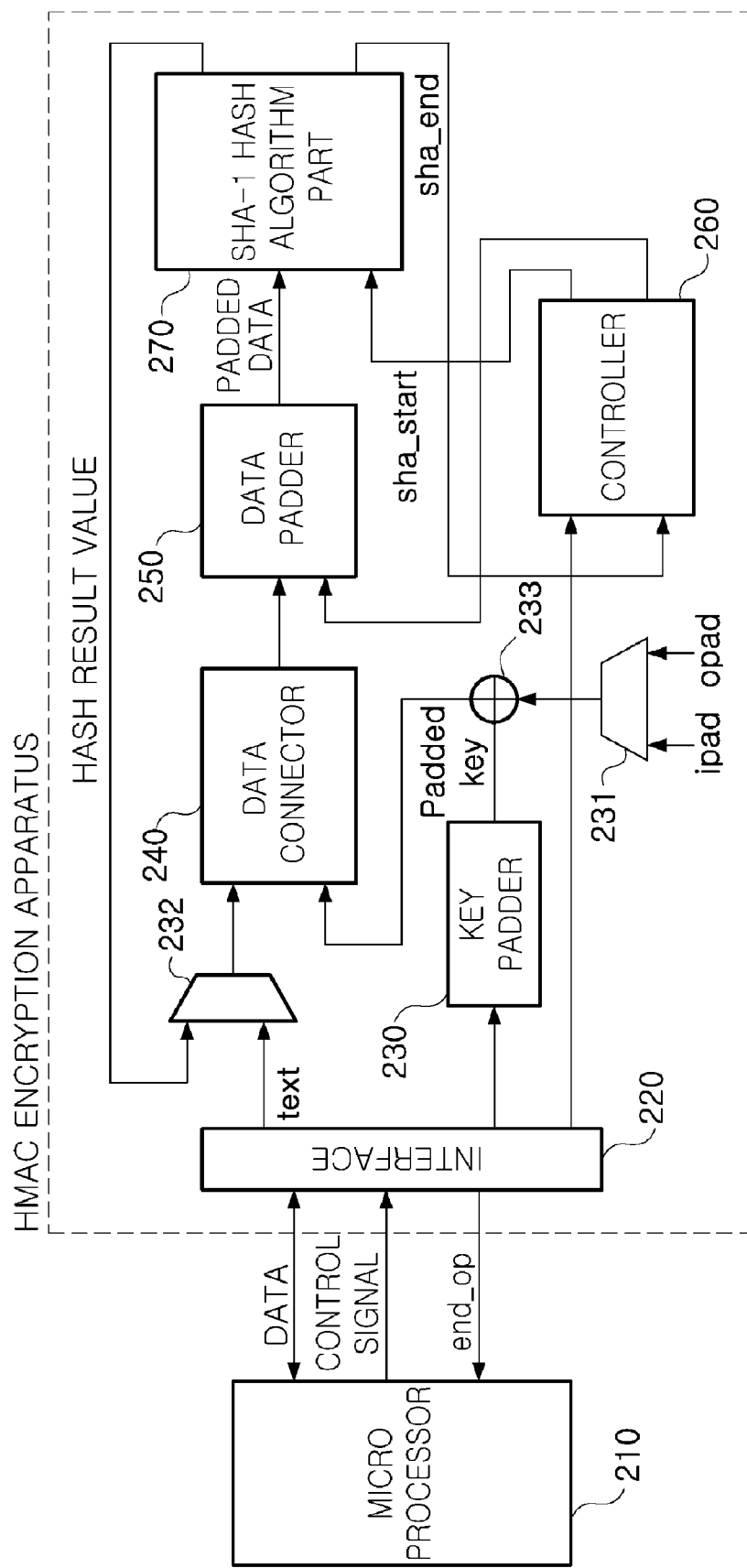
FIG. 2 is a configuration diagram illustrating a low power HMAC encryption apparatus using an SHA-1 hash algorithm part having a low power structure according to an exemplary embodiment of the present invention.

FIG. 2 is a configuration illustrating a low power HMAC encryption apparatus according to an exemplary embodiment of the present invention.

The low power HMAC encryption apparatus is included in a mobile platform and operates coupled with a microprocessor 210. The microprocessor 210 controls all internal operations required in an algorithm for mobile trusted computing (MTC).

In addition, the microprocessor 210 administrates an interface of the mobile platform, controls operations of an encryption module in a trusted platform module (TPM), and executes instructions described in a TCG specification.

Though only the mobile platform has been described, the HMAC encryption apparatus of the present invention may be applied to whatever apparatus where there is a limitation on power resource or low power consumption is required.

Referring to FIG. 2, the HMAC encryption apparatus includes an interface 220, a key padder 230, an input selector 231, an output selector 232, an XOR operator 233, a data connector 240, a data padder 250, a controller 260, and an SHA-1 hash algorithm part 270.

The interface 220 connects a microprocessor 210 used in a TPM, to the HMAC encryption apparatus to transmit and receive data and instructions.

In detail, the interface 220 analyzes data and instructions transmitted from the microprocessor 210, and stores the data and instructions in internal control register (not shown) when the data and instructions should be executed by the HMAC encryption apparatus. Control signals stored in the control register are used to generate a control signal required for driving the low power HMAC encryption apparatus, in the controller 260.

The interface 220 receives only data in the case of an SHA-1 hash algorithm and receives data together with a secret key in the case of an HMAC algorithm. In this case, setting a path of required data is controlled by the controller 260.

Also, in the case of the SHA-1 algorithm, the interface 220 additionally receives an instruction for determining whether to perform the SHA-1 hash operation once or to consecutively perform the SHA-1 hash algorithm with respect to consecutive data.

The interface 220 outputs an interrupter signal end-op notifying a result of one of an SHA-1 hash operation and an HMAC operation performed by the HMAC encryption apparatus and an end thereof, to the microprocessor 210.

The key padder 230 extends a key of 49 bytes or 64 bytes defined as an option in addition to an input key of 20 bytes defined in TPM standards for HMAC encryption, to a length of 64 bytes defined in the HMAC algorithm. A value of the key padded by the key padder 230 is XOR operated with one of the padding constants ipad and opad, selected by the input selector 231 selecting a constant value.

The data connector 240 connects a text inputted via the interface 220 to a key value obtained by the XOR operation. Also, as defined in the HMAC algorithm of FIG. 1, a result of performing an SHA-1 algorithm one time is connected to a value obtained by XOR operating opad value and applied to the data padder 250. In this case, data applied to the data connector 240 is selected by the output selector 232.

The operation of the data padder 250 varies with an operation mode of the HMAC encryption apparatus. When the HMAC encryption apparatus performs only an SHA-1 hash algorithm, data padding operation required to perform the SHA-1 hash algorithm is performed, and the data padding operation calculating a length of entire data and inputting the length of entire data as a length of 64 bits is performed. When the HMAC encryption apparatus performs an HMAC operation, data padding operation required for the data connected by the data connector 240 is performed and the data padding is performed by calculating a length of the entire data.

In the case of the HMAC operation of the present invention, there are a preprocessing operation for processing key data and a preprocessing operation for connecting and padding data. So, a memory for the key data is distinguished from a memory for the data and the preprocessing operations for processing the key data and the data are performed at the same time, thereby reducing an amount of time used in the HMAC operation.

Accordingly, to perform efficient operations of the HMAC encryption apparatus, the key padder 230, the data connector 240, and the data padder 250 include a key memory storing a key and a data memory storing data, separated from each other.

Also, the key padder 230, the data connector 240, and the data padder are formed of a memory and several auxiliary circuits. The memory used for the several auxiliary circuits is formed of a 512-bit single port memory using registers formed of basic logic cells.

To minimize power consumption, there is no switching when registers forming such memory do not operate. Also, a memory is capable of replacing by a suitable module according used process and technology and a dual-port memory may be also used.

The SHA-1 hash algorithm part 270 performs an SHA-1 hash algorithm. The SHA-1 hash algorithm part 270 receiving an output value of the data padder 250 as an input, receives an sha_start signal that is an instruction to start an operation, applied form the controller 260 and starts the operation. When the SHA-1 hash algorithm of 80 rounds is finished, an sha_end signal indicating that the algorithm is finished is outputted.

In the SHA-1 hash algorithm part 270, there is an additional hash algorithm control unit (refer to 360 of FIG. 3) controlling an execution of an SHA-1 hash algorithm, which notifies a start and an end of an operation by a handshake with the controller 260 of the HMAC encryption apparatus.

By using the handshake, preprocessing functions for an SHA-1 hash algorithm and an HMAC algorithm may be performed while separated from each other. The SHA-1 hash algorithm part 270 will be described in detail with reference to FIGS. 3 and 4.

The controller 260 administrates and controls a data flow of the overall HMAC encryption apparatus. As described above, a little time is required to perform the SHA-1 hash algorithm of 80 rounds and the SHA-1 hash algorithm is repeatedly performed four or more times in the case of the HMAC algorithm.

Accordingly, while the SHA-1 hash algorithm is performed, a preprocessing operation for an SHA-1 algorithm that will be performed next, thereby allowing an efficient calculation reducing a time of performing the HMAC algorithm. For the control process, the controller 260 controls the SHA-1 hash algorithm part 270 by using the control signals such as sha_start and sha_end.

Also, the controller 260 controls data input/output via the interface 220 and distinguishes whether a value applied to the interface 220 is data or a control instruction by checking addresses of inputted data, and processes the data or the control instruction.

Also, the controller 260 differently controls according to a kind of an algorithm performed by the low power HMAC encryption apparatus. The kind of the algorithm to be performed by the HMAC encryption apparatus is determined by a control instruction transmitted from the microprocessor 210 to the HMAC encryption apparatus.

That is, when an address of inputted data is checked and the inputted data is a control instruction, the controller 260 performs a state transfer to store the inputted data in a control register in the interface 220.

The controller 260 checks the control instruction stored in the control register, recognizes a kind of an algorithm to be performed by the HMAC encryption apparatus, and starts a state transfer corresponding to the algorithm to be performed. In addition, the controller 260 reads data required for performing an encryption algorithm performed by the HMAC encryption apparatus, controls operations of the key padder 230, the data connector 240 and data padder 250 to store values of the data, and controls an address of data to be read therefrom and a sequence of reading, a sequence of performing a hash algorithm performed by the SHA-1 hash algorithm part 270 and process of storing algorithm results.

Figure 3:
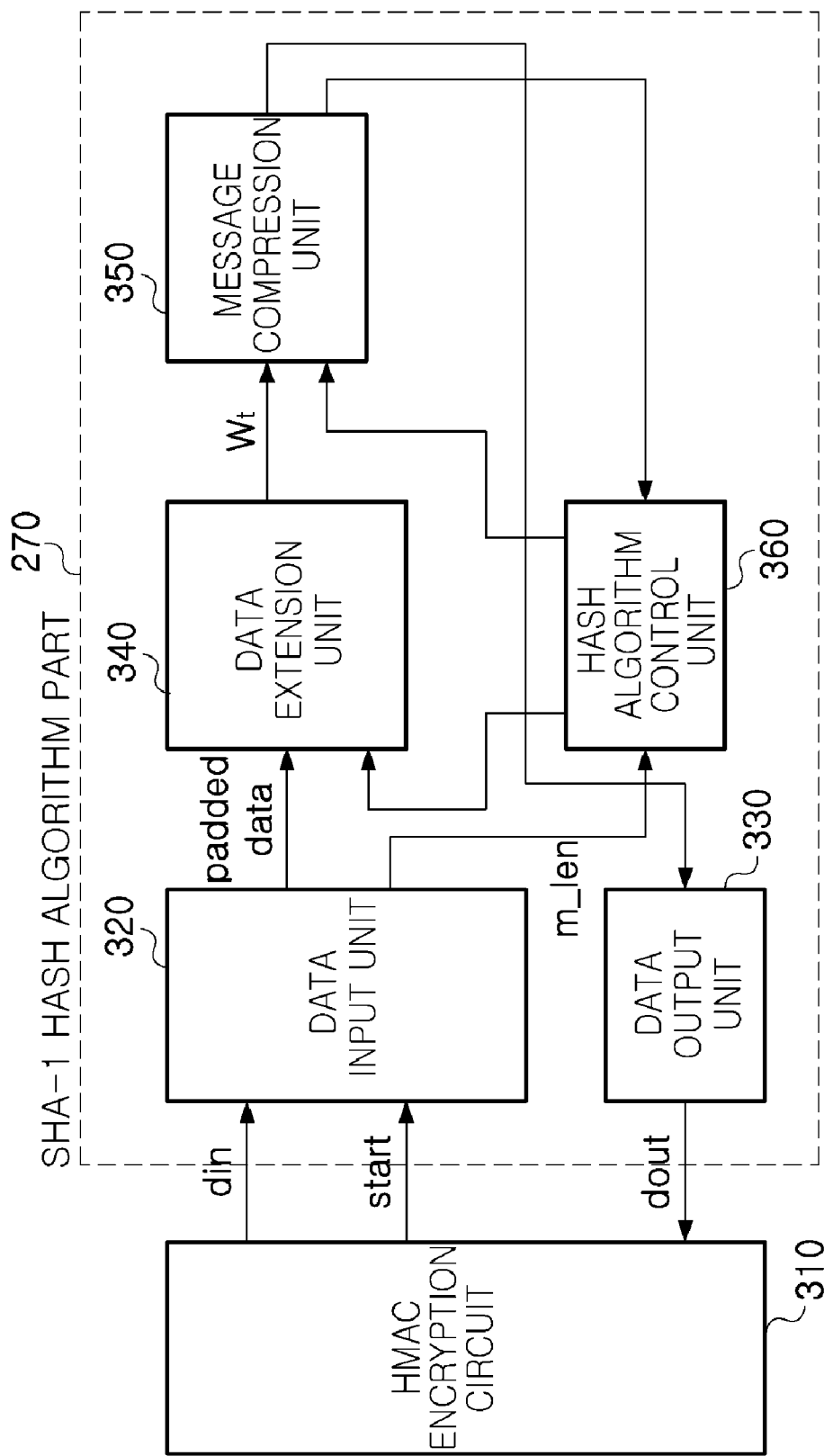
FIG. 3 is a configuration diagram illustrating the SHA-1 hash algorithm part shown in FIG. 2 in detail.

FIG. 3 is a configuration illustrating the SHA-1 hash algorithm part 270 with a low power structure, in detail.

Referring to FIG. 3, the SHA-1 hash algorithm part 270 includes a data input unit 320, a data output unit 330, a data extension unit 340, a message compression unit 350, and a hash algorithm control unit 360. An HMAC encryption circuit 310 indicates other circuits of the HMAC encryption apparatus of FIG. 2 in addition to the SHA-1 hash algorithm part 270.

The data input unit 320 transmits data din applied via the HMAC encryption circuit 310 to the data extension unit 340 and transmits a control signal start to the hash algorithm control unit 360. Also, the data input unit 320 transmits length information m_len of the data din padded and inputted by the HMAC encryption circuit 310, to the hash algorithm control unit 360.

When an SHA-1 hash algorithm is finished, the data output unit 320 reads and transmits a hash result value stored in the message compression unit 350, to the HMAC encryption circuit 310.

The data extension unit 340 is formed of a memory (refer to 410 of FIG. 4) and an additional circuit, stores the data din inputted via the data input unit 320 in one 32-bit register, and generates and applies an intermediate value $W_t$ required in overall 80 rounds of the hash algorithm, to the message compression unit 350. The data extension unit 340 will be described later in detail with reference to FIG. 4.

The message compression unit 350 actually performs an SHA-1 hash algorithm. The message compression unit 350 receives an intermediate value $W_t$ of each round for a hash algorithm applied from the data extension unit 340, repeatedly performs the hash algorithm of 80 rounds by using one adder, and stores a hash result value in an internal register (not shown). The message compression unit 350 will be described later in detail with reference to FIGS. 5 and 6.

The hash algorithm control unit 360 controls a sequence of overall operations performed by modules forming the SHA-1 hash algorithm part 270 required for the low power HMAC encryption apparatus provided by the present invention, and a data flow.

Also, the hash algorithm control unit 360 controls a series of operations of message scheduling, selecting a constant value used in message compression and functions, and storing data in a register, which are required in an algorithm of 80 rounds to sequentially generating a suitable control signal according to operations performed by the SHA-1 hash algorithm part 270, to be performed according to a previously designated process.

That is, to control operations of an SHA-1 hash algorithm by the hash algorithm control unit 360, a flow of states for processing data input, data output, control instruction input, a round operation for data compression, and interrupt occurrences, respectively, should be defined. It is required to design in such a way that a mutual transfer may be performed between the states according to necessity.

For example, when performing a message compression algorithm, it is required to select a constant used according to each round, store an intermediate result of a round operation in a register in the message compression unit 350, change a state to perform a next round, transfer to an interrupt occurrence state when an SHA-1 hash algorithm is performed and all algorithms are finished, and generate an interrupt indicating an end of the algorithm.

Accordingly, efficiency of a circuit area, power consumption, and an operation speed of the low power SHA-1 hash algorithm part 270 depends on a structure of the data extension unit 340 and the message compression unit 350, which is shown in FIG. 3. The data extension unit 340 and the message compression unit 350 will be described in detail with reference to FIGS. 4 to 6.

Figure 4:
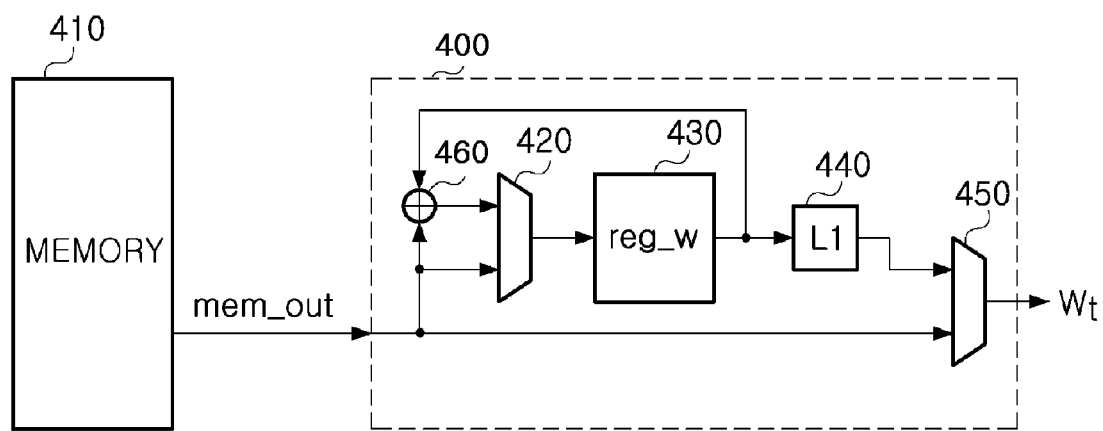
FIG. 4 is a configuration diagram illustrating a data extension unit according to an exemplary embodiment of the present invention, in detail.

FIG. 4 is a configuration diagram illustrating the data extension unit 340 in detail. The data extension unit 340 calculates and applies $W_t$ used in each round operation of an SHA-1 hash algorithm from inputted data, to the message compression unit 350.

$W_t$ is obtained by following Equation 1. In Equation 1, ⊕ indicates an XOR operation and t indicates a number of rounds of the SHA-1 hash algorithm, which is from 0 to 79.

$$W_t = \begin{cases} M_t^{(i)} & 0 \le t \le 15 \\ ROTL^1(W_{t-3} \oplus W_{t-8} \oplus W_{t-14} \oplus W_{t-16}) & 16 \le t \le 79 \end{cases} \quad \text{Equation (1)}$$

According to Equation 1, as $W_t$ used in each round operation of the hash algorithm, 32-bit data $M_t^{(i)}$ is used as it is from 0 to 15 rounds in 80 rounds and a previous $W_t$ is used in 16 to 79 rounds. The 32-bit data $M_t^{(i)}$ is data obtained by dividing 512 bits of an input value by 32-bit unit.

The memory 410 stores padded data applied via the data input unit 320 and has a length of 512 bits.

The memory 410 outputs data stored by a control of the hash algorithm control unit 360 by a 32-bit unit and stores a calculated value of $W_t$ to calculate a value of $W_t$ of a round operation to be performed later.

A logic circuit part 400 outputs a value of $W_t$ of each round by using Equation 1.

That is, a first data selector 420 of the logic circuit part 400 determines a path to select and store one of a value of data read from the memory 410 and a value obtained by XOR operating a value stored in a 32-bit register 430 with the value of the data read from the memory 410, in the 32-bit register 430.

The 32-bit register 430 calculates and stores a value of $W_t$ used in a round after initial 16 rounds, as an intermediate value.

When an algorithm of four times is finished, in the 32-bit register 430, operation values before rotation, obtained by Equation 1, that is, XOR operation contents of $W_{t-3}$, $W_{t-8}$, $W_{t-14}$, and $W_{t-16}$ are stored and a result thereof is outputted via a rotation unit 440.

The rotation unit 440 rotates the result value of performing the four times XOR operations by 1-bit and outputs a result obtained by the rotation to a second data selector 450. The rotation unit 440 may be simply embodied by changing a sequence of connection in hardware.

The second data selector 450 is used to select a value of $W_t$ outputted according to a round. That is, in the initial 16 rounds, data outputted from the memory 410 as $W_t$ is selected as it is. In a round thereafter, a result value of an operation of the rotation unit 440 is selected and outputted.

Generally, to embody an SHA-1 hash algorithm circuit, 32-bit registers of 16 levels for the operation of Equation 1 are used. However, when considering an area and power consumption of the SHA-1 hash algorithm circuit, this is inefficient to apply to a mobile environment.

Accordingly, in the present invention, instead of using 16 32-bit registers, one 32-bit register is used to form the data extension unit 340 to calculate $W_t$ by accessing a memory data and XOR operating of four times. The construction may reduce an area and power consumption of a circuit though there is a more amount of time is used, comparing with using 16 registers.

Figure 5:
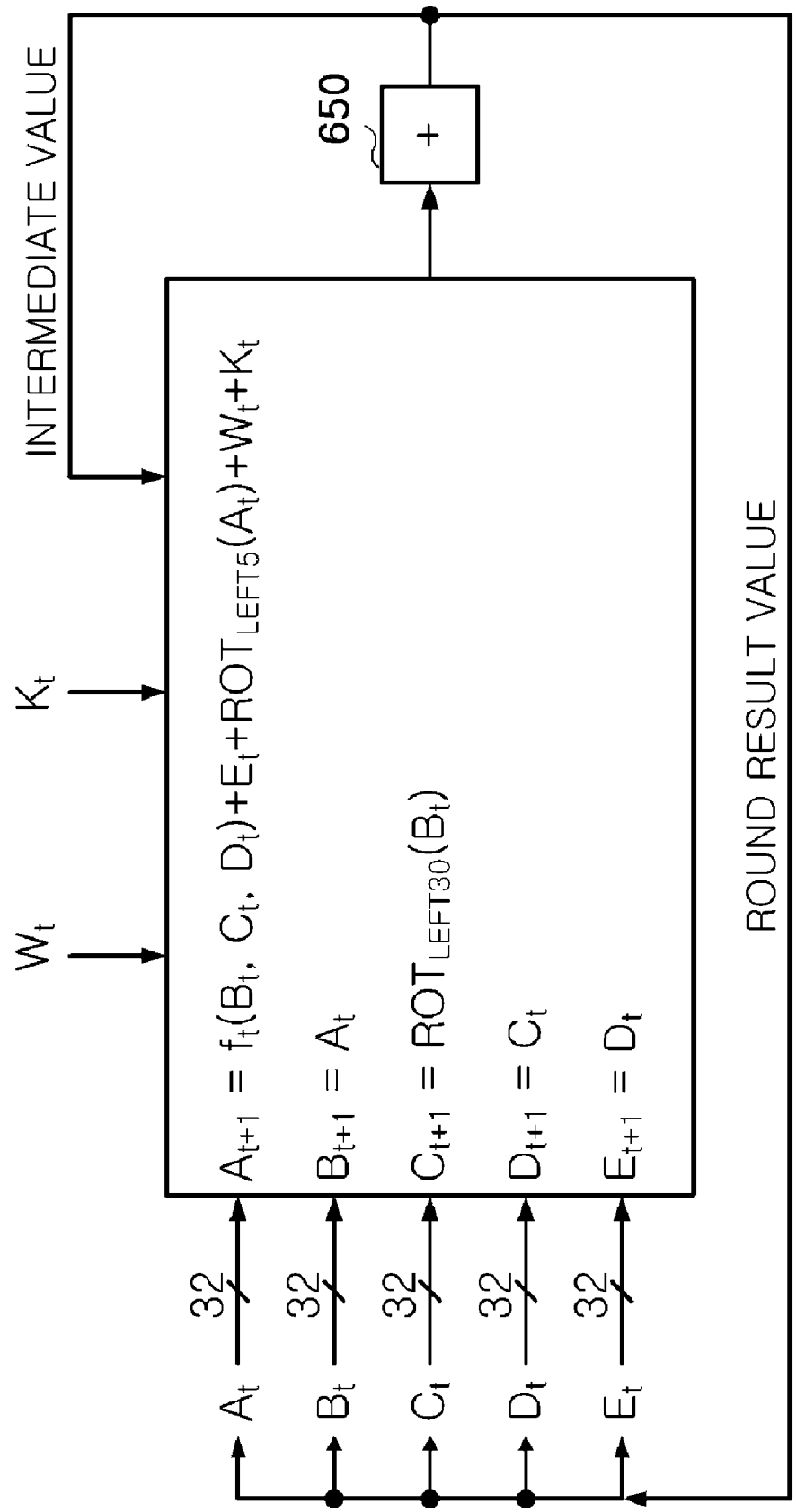
FIG. 5 is a block diagram illustrating functional features of a message compression unit according to an exemplary embodiment of the present invention.

FIG. 5 is a block diagram illustrating the message compression unit 350 formed of five 32-bit registers and one adder in the SHA-1 hash algorithm part.

Referring to FIG. 5, to perform an SHA-1 hash algorithm, five variables $A_t$, $B_t$, $C_t$, $D_t$, and $E_t$ stored in the five 32-bit registers, respectively, are used. Four of the five variables are shifted by one level and are required only to calculate the variable $A_t$.

That is, $A_t$ operation is obtained by two times of rotating and shifting and four times of $2^{32}$ modular addition by using $W_t$, $K_t$ that is a round constant, and other variables as input.

Accordingly, to have a small area/low power structure, the message compression unit 350 performs the At operation by performing four times of addition for each clock period by using one adder. In this case, the variable $E_t$ is used as a medium for storing an intermediate value of the addition operation. This may be shown as following Equation 2.

$$t_1 : E_{t_1} = E_{t_0} + K_t$$

$$t_2 : E_{t_2} = E_{t_1} + ROT_{LEFT5}(K_t)$$

$$t_3 : E_{t_3} = E_{t_2} + W_t$$

$$t_4 : A_t = E_{t_3} + F(B,C,D) \quad \text{Equation (2)}$$

Figure 6:
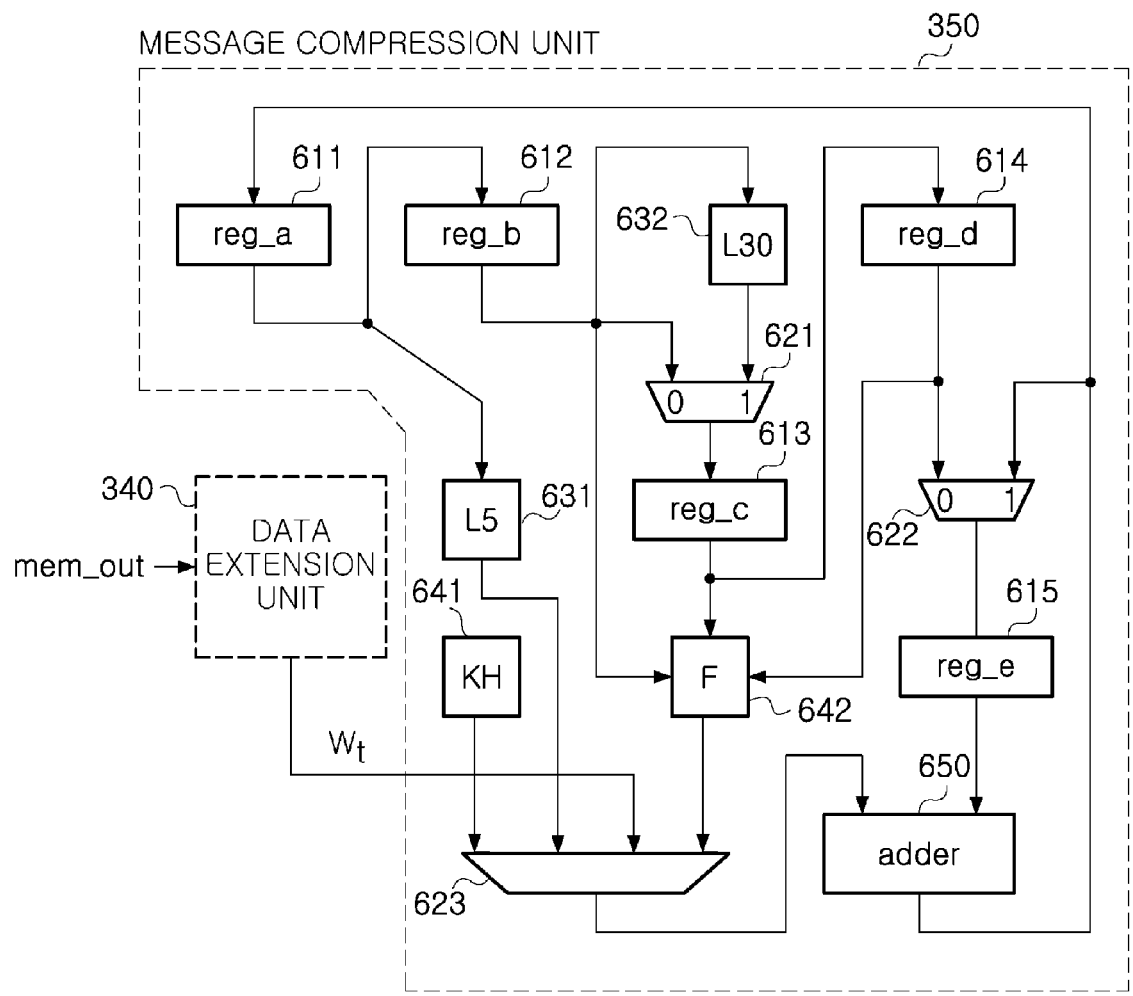
FIG. 6 is a configuration diagram illustrating the message compression unit.

FIG. 6 is a configuration diagram illustrating the message compression unit 350 formed of 32-bit registers of five levels and one adder, in detail.

In a KH unit 641, an initial value Hi required in performing an SHA-1 algorithm and the round constant $K_t$ are stored. Also, when a message required in the SHA-1 hash algorithm is greater than 512 bits, the KH unit 641 updates the initial value $H_i$ required in performing a next SHA-1 algorithm.

When the apparatus is initiated while an initial value is stored in the KH unit 641, all 32-bit registers 611 to 615 are initiated as 0 and initial values $H_0$ to $H_4$ defined in the SHA-1 hash algorithm are read from the KH unit 641 and stored by all 32-bit registers.

Describing a process of storing an initial value in the respective registers 611 to 615, the initial value $H_4$ is outputted to the KH unit 641 and inputted to an adder 650 via a data selector 623.

Since all registers reg_a, reg_b, reg_c, reg_d, and reg_e 611 to 615 are initially set as 0, an output of the adder 650 is still $H_4$ and the initial value $H_4$ is stored in the reg_a 611.

$H_3$ is read from the KH unit 641 and stored in the reg_a 611 by the same path. Since an initial value of the reg_e 615 is still set as 0, $H_3$ is stored in the reg_a 611 and $H_4$ originally stored in the reg_a 611 is shifted and stored in the reg_b 612. Such operation is repeated five times, thereby storing $H_0$ in the reg_a 611.

As described above, after initial values $H_i$ are stored, as indicated in the SHA-1 algorithm, 80 rounds of algorithms are performed.

In this case, a data selector 621 selects a value obtained by shifting an output of the reg_b 612 by 30 bits and the data selector 623 sets a value for four times of additions.

As known from Equation 2, the reg_e 615 stores an intermediate result of the additions while performing the four times of additions. For this, a data selector 622 is set as a path 1. A result of the four times of additions is stored in the reg_a 611.

An F function 642 is formed of a series of logic functions, which receives three variables $B_t$, $C_t$, and $D_t$ for each round and outputs a 32-bit result.

During a last round operation, the adder 650 outputs a final result value obtained by adding values stored in the five registers reg_a to reg_e, a result value of a previous message block, and certain initial values.

Accordingly, according to an exemplary embodiment of the present invention, to form a low power HMAC encryption apparatus used in an MTC environment, a handshake method where a part driving an SHA-1 algorithm is separated from and a controller of a part performing an HMAC algorithm, between the HMAC encryption apparatus and an SHA-1 hash algorithm apparatus is used, a key memory is separated from a data memory to perform the SHA-1 hash algorithm simultaneously with a preprocessing process of an SHA-1 algorithm that will be performed next.

Also, when an SHA-1 hash algorithm and an HMAC algorithm are independently required in a platform, to support a corresponding algorithm, a kind of the algorithm is designated by using a control register in an interface and the SHA-1 hash algorithm part supports both of the SHA-1 hash algorithm and the HMAC algorithm.

Also, to minimize power consumed by a circuit block that does not process data, together with design a block for efficiently performing an HMAC encryption algorithm for designing a low power circuit, a clock signal is applied only at a point in time where a value of a register storing data is changed. In the case of a combinational circuit, to reduce switching according to an unnecessary change of a data value, the switching is reduced by using an additional register.

While the present invention has been shown and described in connection with the exemplary embodiments, it will be apparent to those skilled in the art that modifications and variations can be made without departing from the spirit and scope of the invention as defined by the appended claims.

What is claimed is:

1. A low power SHA (secure hash algorithm)-1 hash algorithm apparatus, the apparatus comprising:
   a data input unit receiving and transferring data to be performed a hash algorithm;
   a data extension unit generating an intermediate value of each round of the hash algorithm by using one 32-bit register;
   a message compression unit performing an SHA-1 hash algorithm on the generated intermediate value of the each round for the hash algorithm, by using one adder;
   a data output unit outputting a result value of the SHA-1 hash algorithm; and
   a hash algorithm control unit controlling operation sequences of the data extension unit and the message compression unit.

2. The apparatus of claim 1, wherein the data extension unit comprises:
   a memory storing the data to be performed the hash algorithm and the intermediate value of the each round for the hash algorithm;
   one 32-bit register storing a result of an intermediate operation for obtaining the intermediate value of the each round for the hash algorithm;
   an XOR operator XOR operating the result of the intermediate operation, stored in the register, and the intermediate value of the each round of the hash algorithm, read from the memory;
   an input selector selecting and inputting one of a value obtained by the XOR operating, the data to be performed the hash algorithm, and the intermediate value of the each round for the hash algorithm, stored in the memory, to the one 32-bit register;
   a rotation operator rotating an output value of the one 32-bit register by one bit; and
   an output selector selecting and outputting one of a value obtained by the rotating by one bit and the data read from the memory, as the intermediate value of the each round for the hash algorithm,
   wherein the data extension is performed by low power consumption.

3. The apparatus of claim 1, wherein the message compression unit comprises:
   a KH unit storing an initial value and a constant value for the hash algorithm;
   a first 32-bit register storing a result of adding one of a value obtained by shifting first data by 5 bits, values obtained by F-function operating second to fourth data stored in following second to fourth 32-bit registers, respectively, a round constant value and the intermediate value of the each round for the hash algorithm, and fifth data stored in a following fifth 32-bit register;
   a second 32-bit register storing the first data stored in the first 32-bit register;
   a third 32-bit register storing a value obtained by shifting the second data stored in the second 32-bit register by 30 bits;
   a fourth 32-bit register storing the third data stored in the third 32-bit register;
   a fifth 32-bit register storing the fourth data stored in the fourth 32-bit register;
   a rotation shifter shifting data outputs of the first and second 32-bit registers, respectively;
   an F-function operator F-function operating the second to fourth data of the second to fourth 32-bit registers;
   a plurality of input selector selecting a data path; and
   one adder calculating the first data by adding four times for each clock period repeatedly.

4. The apparatus of claim 3, wherein the one adder generates a hash result value of final 80 rounds of the SHA-1 hash algorithm by adding one of the value obtained by shifting the first data by 5 bits, the values obtained by F-function operating the second to fourth data stored in the second to fourth 32-bit registers, respectively, the round constant value and the intermediate value of the each round for the hash algorithm, and the fifth data stored in the fifth 32-bit register.

5. The apparatus of claim 2, wherein the hash algorithm control unit controls the input in such a way that a value obtained by XOR operating four times is stored in the one 32-bit register.

6. A low power HMAC (keyed-hash message authentication code) encryption apparatus using a low power SHA-1 hash algorithm, the apparatus comprising:
   a key padder padding key data for an HMAC algorithm;
   an XOR operator XOR operating the padded key data and a padding constant;
   a data connector connecting a text to be encrypted, to data obtained by the XOR operating;
   a data padder padding the connected data;
   an SHA-1 hash algorithm part performing an SHA-1 hash algorithm on the padded data;
   a data selector selecting and applying one of a result of the SHA-1 hash algorithm and the text to be encrypted, to the data connector; and
   a controller controlling operations of the key padder, data connector, and data padder, a sequence of performing a hash algorithm of the SHA-1 hash algorithm part, and storing an operation result to read data required for performing an encryption operation and store data with memory,
   wherein the SHA-1 hash algorithm part comprises:
   a data input unit receiving and transferring data to be performed a hash algorithm;
   a data extension unit generating an intermediate value of each round of the hash algorithm by using one 32-bit register;

a message compression unit performing an SHA-1 hash algorithm on the generated intermediate value of the each round for the hash algorithm, by using one adder;

a data output unit outputting a result value of the SHA-1 hash algorithm; and a hash algorithm control unit controlling operation sequences of the data extension unit and the message compression unit.

7. The apparatus of claim 6, wherein the key padder is formed of a 512-bit single-port key memory by using an internal register of 32-bit unit.

8. The apparatus of claim 6, wherein the data connector and the data padder are formed of 512-bit single-port data memories by using registers of 32-bit unit.

9. The apparatus of claim 8, wherein the data padder performs data padding by a data length required according to one of the SHA-1 hash algorithm and HMAC algorithm.

10. The apparatus of claim 6, wherein the data extension unit comprises:

a memory storing the data to be performed the hash algorithm and the intermediate value of the each round for the hash algorithm;

one 32-bit register storing a result of an intermediate operation for obtaining the intermediate value of the each round for the hash algorithm;

an XOR operator XOR operating the result of the intermediate operation, stored in the register, and the intermediate value of the each round of the hash algorithm, read from the memory;

an input selector selecting and inputting one of a value obtained by the XOR operating, the data to be performed the hash algorithm, and the intermediate value of the each round for the hash algorithm, stored in the memory, to the one 32-bit register;

a rotation operator rotating an output value of the one 32-bit register by one bit; and an output selector selecting and outputting one of a value obtained by the rotating by one bit and the data read from the memory, as the intermediate value of the each round for the hash algorithm, wherein the data extension is performed by low power consumption.

11. The apparatus of claim 10, wherein the message compression unit comprises:

a KH unit storing an initial value and a constant value for the hash algorithm;

a first 32-bit register storing a result of adding one of a value obtained by shifting first data by 5 bits, values obtained by F-function operating second to fourth data stored in following second to fourth 32-bit registers, respectively, a round constant value and the intermediate value of the each round for the hash algorithm, and fifth data stored in a following fifth 32-bit register;

a second 32-bit register storing the first data stored in the first 32-bit register;

a third 32-bit register storing a value obtained by shifting the second data stored in the second 32-bit register by 30 bits;

a fourth 32-bit register storing the third data stored in the third 32-bit register;

a fifth 32-bit register storing the fourth data stored in the fourth 32-bit register;

a rotation shifter shifting data outputs of the first and second 32-bit registers, respectively;

an F-function operator F-function operating the second to fourth data of the second to fourth 32-bit registers;

a plurality of input selector selecting a data path; and one adder calculating the first data by adding four times for each clock period repeatedly.

12. The apparatus of claim 11, wherein the first to fifth 32-bit registers read and store the initial value from the KH unit.

13. The apparatus of claim 11, wherein the KH unit stores a final result value obtained when the SHA-1 hash algorithm of the 80 rounds using the round constant value and the initial value is finished.

14. The apparatus of claim 6, wherein the hash algorithm control unit controls the input selector in such a way that a value obtained by XOR operating four times is stored in the one 32-bit register.

15. The apparatus of claim 6, wherein the controller determines one of the SHA-1 hash algorithm and the HMAC algorithm and determines whether one of the SHA-1 hash algorithm and the HMAC algorithm is to be performed once or to be consecutively performed.

* * * * *